(12) United States Patent
Kwak et al.

(10) Patent No.: US 7,884,152 B2
(45) Date of Patent: Feb. 8, 2011

(54) MANUFACTURING METHOD OF ORGANIC MODIFER-FREE EXFOLIATED NANO CLAY-POLYMER COMPOSITE

(75) Inventors: Seung-Yeop Kwak, Seoul (KR); Se-Bum Son, Anyang-si (KR); Sang-Wook Chun, Yongin-si (KR)

(73) Assignee: Seoul National University Industry Foundation, Seoul (KR)

( * ) Notice: Subject to any disclaimer, the term of this patent is extended or adjusted under 35 U.S.C. 154(b) by 512 days.

(21) Appl. No.: 11/989,630

(22) PCT Filed: May 23, 2007

(86) PCT No.: PCT/KR2007/002495

§ 371 (c)(1),
(2), (4) Date: Jan. 29, 2008

(87) PCT Pub. No.: WO2008/105575

PCT Pub. Date: Sep. 4, 2008

(65) Prior Publication Data

US 2010/0093912 A1    Apr. 15, 2010

(30) Foreign Application Priority Data

Feb. 26, 2007  (KR) ...................... 10-2007-0018848

(51) Int. Cl.
*C08K 3/34* (2006.01)
(52) U.S. Cl. ........................ 524/446; 524/445; 524/605
(58) Field of Classification Search ................. 524/445, 524/446, 605
See application file for complete search history.

(56) References Cited

U.S. PATENT DOCUMENTS

| 6,071,988 | A | 6/2000 | Barbee |
| 6,084,019 | A | 7/2000 | Matayabas, Jr. |
| 6,765,049 | B2 | 7/2004 | Lorah |
| 6,794,437 | B2 | 9/2004 | Ross |
| 7,022,299 | B2 * | 4/2006 | Lin et al. .................... 423/335 |
| 7,125,916 | B2 | 10/2006 | Lin |

FOREIGN PATENT DOCUMENTS

KR    10-2006-0078370    7/2006

* cited by examiner

*Primary Examiner*—Vickey Nerangis
(74) *Attorney, Agent, or Firm*—Yancy IP Law, PLLC

(57) ABSTRACT

The present invention relates to a manufacturing method of organic modifier-free exfoliated nano clay-polymer composite. The manufacturing method of organic modifier-free exfoliated nano clay-polymer composite includes (S1) dispersing layered clay nanoparticles and dissolving a thermoplastic polymer in an acidic solvent; (S2) adding the product of step (S1) to a polymer non-solvent incapable of dissolving the polymer, but capable of dissolving the organic modifier separated from the organized layered clay nanoparticles; and (S3) separating an organic modifier-free exfoliated nano clay-polymer composite from the product of step (S2). The inventive manufacturing method can maximally improve the physical properties of composites through the addition of the exfoliated clay nanoparticles by removing the organic modifier that may deteriorate physical properties of the composite from the exfoliated clay nanoparticles dispersed therein.

6 Claims, 2 Drawing Sheets

MANUFACTURING METHOD OF ORGANIC MODIFER-FREE EXFOLIATED NANO CLAY-POLYMER COMPOSITE

CROSS REFERENCE TO RELATED APPLICATIONS

This application claims the benefit of prior Korean application 0.10-2007-0018848 filed on Feb. 26, 2007 and prior International Application PCT/KR2007/002495 filed on May 23, 2007, the contents of which are expressly incorporated herein by reference.

BACKGROUND OF THE INVENTION

1. Technical Field

The present invention relates to a manufacturing method of a polymer composite, in which exfoliated clay nanoparticles are uniformly dispersed, and in particular, to a manufacturing method of an organic modifier-free exfoliated nano clay-polymer composite.

2. Background Art

Unlike conventional composites, a polymer nanocomposite improves physical properties of polymers by introducing piled sheets of layered clay nanoparticles spaced at nanometer intervals, so-called layered silicates. In addition, the conventional composite contains several tens of wt % of inorganic additives used to improve its physical property, whereas the polymer nanocomposite contains inorganic additives below 5 wt %. Furthermore, although the used amount of inorganic additives is reduced, the polymer nanocomposite exhibits its physical property similar to or better than the conventional composite.

Generally, clay nanoparticles used in the polymer nanocomposite are made from layered silicate which has large surface area (about 750 m$^2$/g) and high aspect ratio of 50 or more, and in which a single layer is about 1 nm thick. When the layered silicate is exfoliated, attractive forces applied between layers of clay nanoparticles disappear and the clay nanoparticles are uniformly dispersed in the polymer matrix, a process called as exfoliation. Due to exfoliation, the polymer nanocomposite attains improved physical properties such as mechanical properties, heat-resistance and gas barrier properties, obtained at a lighter weight compared with a conventional composite. The 'nano clay-polymer composite' having the above-mentioned advantages, in which clay nanoparticles are uniformly dispersed in a polymer, is applied to products of various purposes, for example functional resins or various coating materials with an enhanced capability for suppressing penetration of gases and liquids, flame prevention, wear resistance and high-temperature stability.

For example, Toyota CRDL group in Japan has developed a nylon nanocomposite by using these advantages, and building up on this, many research groups have applied nylon-6 nanocomposite to timing belt covers and barrier layers for fuel lines of automobiles. In addition, commercial products are continuously developed by using the polymer nanocomposite, for example a thermoplastic olefin (TPO) nanocomposite is applied to automobile step-assist parts and body side moldings by General Motors (GM) of USA, Basell and Southern Clay Products. Honeywell of USA has applied nylon nanocomposites to a barrier material for an intermediate layer of multilayer PET bottle having an improved oxygen barrier property.

Essentially, clay nanoparticles are not uniformly dispersed in a polymer matrix, and thus it is difficult to add the clay nanoparticles during the manufacture of the polymer nanocomposite. That is, clay nanoparticles (layered silicate) serving as fillers in manufacturing a polymer nanocomposite are basically hydrophilic and poorly mixed with the polymer which is generally hydrophobic; thus it is difficult to obtain a polymer nanocomposite having a desired level of improved physical properties. Therefore, to provide hydrophobicity to the layered silicate, it was necessary to substitute an organic modifier having a cationic head and a hydrophobic tail into the space between the silicate layers to create ionic bonds. For example, when an organic modifier having organic ammonium ions is introduced between layers of the clay nanoparticles, due to its structural characteristic, one end of the organic modifier exchanges with such cations as Na$^+$ present between the clay layers and forms bonds to the clay layers. The other end of the organic modifier exhibits a hydrophobic property capable of reacting with or being compatible to the polymer. Further, the spacing between the clay layers is expanded according to the structure of the organic modifier, thereby improving the intercalation capability of a polymer chain in a polymerization or compounding step.

A manufacturing method of an organic clay nanocomposite is described in detail, and first, the clay nanoparticles are dispersed in an excess of deionized water, and the organic modifier to be introduced between the clay layers is treated with HCl (hydrochloric acid) in consideration of the cationic exchange capacity (CEC) of the clay to prepare an organic modifier solution in the form of salt. The organic modifier solution is slowly added while the clay nanoparticle-dispersed solution is agitated, and thus cationic ions in the clay such as Na+ ions are exchanged with the organic modifier, and the organic modifier is intercalated between the clay layers to change the clay nanoparticles in organic clay nanoparticles.

The resultant organic clay nanoparticles are dispersed in various polymers, for example, polyester to manufacture nanocomposites (See U.S. Pat. No. 6,071,988, or 6,084,019). Depending on the manufacturing method of the nanocomposite, nanocomposites containing clay nanoparticles may include intercalation type nanocomposite in which a polymer is intercalated between the clay nanoparticle layers, or an exfoliation type nanocomposite in which clay nanoparticles are completely exfoliated between the nanoparticle layers. Generally, the exfoliation type nanocomposites have better physical properties than the intercalation type nanocomposites.

However, the organic modifier that is ion-bonded to the clay nanoparticles as described above may adversely affect the nanocomposite. In particular, in the case that the nanocomposite is melted at high temperatures according to the purpose of its end use, the color of a product may change due to the thermal decomposition of the organic modifier, or physical, mechanical or optical properties of the nanocomposite may deteriorate as well. As a result, the nancomposite containing the clay nanoparticles may exhibit poorer physical properties than expected.

SUMMARY OF THE INVENTION

The present invention is designed to solve the problems of the prior art mentioned above. Therefore, it is an object of the present invention to provide a manufacturing method of organic modifier-free exfoliated nano clay-polymer composite, which contains exfoliated clay nanoparticles to maximize improvement of physical properties of the composite.

In order to achieve the above-mentioned objects, a manufacturing method of organic modifier-free exfoliated nano clay-polymer composite includes (S1) dispersing layered clay nanoparticles modified by forming ionic bonds with an organic modifier in an acidic solvent and dissolving a thermoplastic polymer in said acidic solvent; (S2) adding the product of step (S1) to a polymer non-solvent capable of dissolving the organic modifier separated from the organic-modified layered clay nanoparticles, but incapable of dissolving said thermoplastic polymer; and (S3) separating the organic modifier-free exfoliated nano clay-polymer composite from the product of the step (S2). The manufacturing method according to the present invention can remove the organic modifier that may deteriorate properties of the composite from the exfoliated clay nanoparticles dispersed in the composite, thereby maximizing improvement of properties of the composite made by addition of the exfoliated clay nanoparticles.

According to the manufacturing method of organic modifier-free exfoliated nano clay-polymer composite, in step (S1), preferably the layered clay nanoparticles modified by forming ionic bonds with the organic modifier are dispersed in at least one solvent selected from the group consisting of chloroform, ethyl ether, acetone, methyl isobutylketone, benzene, toluene, xylene, tetrahydrofuran, methylethylketone, normal hexane, normal pentane, normal octane and propanol, to prepare a dispersion of organic-modified layered clay nanoparticles, followed by the addition of an acidic solvent and a thermoplastic polymer into said dispersion to dissolve the polymer.

According to the manufacturing method of organic modifier-free exfoliated nano clay-polymer composite, the acidic solvent is an solvent capable of separating the organic modifier from the layered clay nanoparticles that become organic by an ionic bond of the organic modifier, and dissolving the polymer, and for example may include at least one solvent selected from the group consisting of acetic acid, phosphoric acid, sulfuric acid and trifluoroacetic acid.

And, according to the manufacturing method of organic modifier-free exfoliated nano clay-polymer composite, the polymer non-solvent may include at least one solvent selected from the group consisting of methanol, ethanol and water, or mixture thereof.

DETAILED DESCRIPTION OF THE INVENTION

Figure 1:
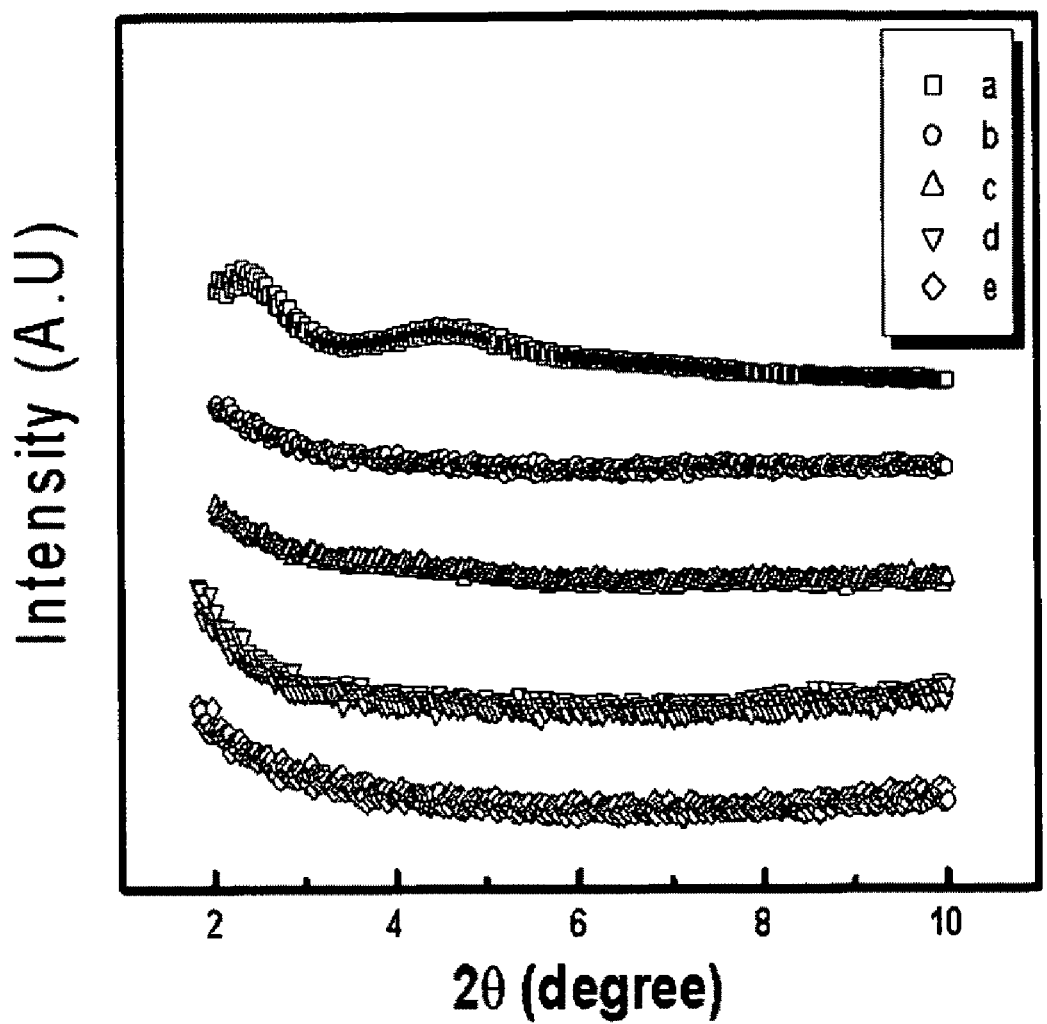
FIG. 1 is an X-ray diffraction graph of composites obtained by the manufacturing methods according to the examples and comparison examples of the present invention.

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A manufacturing method of organic modifier-free exfoliated nano clay-polymer composite is described as follows.

First, layered clay nanoparticles modified by forming ionic bonds with an organic modifier are dispersed in an acidic solvent and a thermoplastic polymer is dissolved in the same solvent (S1). The acidic solvent can separate the organic modifier from the layered clay nanoparticles modified by forming ionic bonds with the organic modifier and dissolve the polymer, examples of such acidic solvent may include acetic acid, phosphoric acid, sulfuric acid, trifluoroacetic acid, and mixtures thereof. The polymer that is dissolved in the acidic solvent is intercalated into the layered clay nanoparticles. And, hydrogen ions provided by the acidic solvent exchanges with the organic modifier ion-bonded to the layered clay nanoparticles, so as to separate the organic modifier from the layered clay nanoparticles. That is, after step (S1) is completed, the organic modifier ion-bonded to the layered clay nanoparticles is dispersed in the acidic solvent, and the layered clay nanoparticles are exfoliated and dispersed between polymer chains.

Preferably, step (S1) is performed in the following two steps. That is, the layered clay nanoparticles modified by forming ionic bonds with the organic modifier are dispersed in a solvent having good dispersibility, for example chloroform, ethyl ether, acetone, methyl isobutylketone, benzene, toluene, xylene, tetrahydrofuran, methylethylketone, normal hexane, normal pentane, normal octane or propanol to prepare a dispersion of organic-modified layered clay nanoparticles. Subsequently, an acidic solvent and a thermoplastic polymer are put into the dispersion to dissolve the polymer, and therefore, the organic modifier is separated from the layered clay nanoparticles and the layered clay nanoparticles are exfoliated.

According to the manufacturing method of organic modifier-free exfoliated nano clay-polymer composite, the organic modifier may be a typical organic modifier that is used to improve dispersibility in the polymer of the layered clay nanoparticles, for example an organic modifier having organic ammonium ions such as polyoxypropylene methyl diethyl ammonium. And, the polymer is not limited to a specific polymer, however may be a polymer capable of changing the properties of the composite by thermal decomposition of the organic modifier in high-temperature processing such as melting, for example a high melting point thermoplastic resin such as polyethylene terephthalate. And, the organic clay nanoparticles may be typical organic nano-clay particles used in exfoliated nano clay-polymer composites, for example organic-modified layered smectite nanoparticles of such clay as sodium montmorillonite, calcium montmorillonite or hectorite, and organic layered mica clay nanoparticles of such clay as mica, or mixture thereof.

Subsequently, the product obtained in step (S1) is added to a polymer non-solvent that does not dissolve the polymer, but dissolves the organic modifier separated from the organic layered nano clay particles (S2).

When the product obtained in step (S1) is added to the polymer non-solvent having the above-mentioned characteristics, an exfoliated nano clay-polymer composite free of the organic modifier is educed as a precipitate, and the organic modifier separated from the organic layered clay nanoparticles remains dissolved in the polymer non-solvent. The polymer non-solvent is not limited to a specific non-solvent, and may include methanol, ethanol, water or mixture thereof.

Finally, the exfoliated nano clay-polymer composite free of the organic modifier is separated from the product obtained in step S2 (S3). That is, when the precipitate of the exfoliated nano clay-polymer composite free of the organic modifier is separated from the polymer non-solvent containing the organic modifier through washing and then dried, an organic modifier-free exfoliated nano clay-polymer composite of the present invention is obtained.

The organic modifier-free exfoliated nano clay-polymer composite obtained through the above-mentioned steps may be used as it is, or after a base polymer is added to the organic modifier-free exfoliated nano clay-polymer composite and melted, the resultant organic modifier-free exfoliated nano clay-polymer composite may be used to manufacture various products. The products may be used in all of well known fields required for the organic modifier-free exfoliated nano clay-polymer composite, for example various textile products, films, coating layers of various panels or films or tire cords.

Hereinafter, preferred embodiments of the present invention will be described in detail. However, the description proposed herein is just a preferable example for the purpose of illustrations only, not intended to limit the scope of the invention, so it should be understood that other equivalents and modifications could be made thereto without departing from the spirit and scope of the invention. The preferred embodiments of the present invention are provided for fully perfect understanding of an ordinary person having average skills in the art.

Comparison Example 1

Smectite clay nanoparticles, organic-modified by polyoxypropylene methyl diethyl ammonium, a typical modifier, are prepared.

Comparison Example 2

Smectite clay nanoparticles, organic-modified by polyoxypropylene methyl diethyl ammonium, are dispersed in 140 g of acetone, the dispersed amount being 8.0 wt % to polyethylene terephthalate. After this, 10 g of polyethylene terephthalate and 60 g of acetic acid are added, and agitated for about one hour. The resultant product is dried at room temperature for 24 hours to manufacture a nanocomposite.

Comparison Example 3

Mica clay nanoparticles, organic-modified by polyoxypropylene methyl diethyl ammonium, are dispersed in 140 g of acetone, the dispersed amount being 8.0 wt % to polyethylene terephthalate. After this, 10 g of polyethylene terephthalate and 60 g of acetic acid are added, and agitated for about one hour. The resultant product is dried at room temperature for 24 hours or more to manufacture a nanocomposite.

Example 1

Smectite clay nanoparticles, organic-modified by polyoxypropylene methyl diethyl ammonium, are dispersed in 140 g of acetone, the dispersed amount being 80 wt % to polyethylene terephthalate. After this, 10 g of polyethylene terephthalate and 60 g of acetic acid are added, agitated for about one hour. Subsequently, the resultant product is dropped into 2000 ml of ethanol, and agitated for 12 hours or more, gone through precipitate filtration, washed and dried using vacuum at room temperature for 24 hours or more to manufacture a nanocomposite.

Example 2

Mica clay nanoparticles, organic-modified by polyoxypropylene methyl diethyl ammonium, are dispersed in 140 g of acetone, the dispersed amount being 80 wt % to polyethylene terephthalate. After this, 10 g of polyethylene terephthalate and 60 g of acetic acid are added, and agitated for about one hour. Subsequently, the resultant product is dropped into 2000 ml of ethanol, agitated for 12 hours or more, gone through precipitate filtration, washed and dried using vacuum at room temperature for 24 hours or more to manufacture a nanocomposite.

Contrast Example 1

The organic-modified smectite clay nanoparticles of the comparison example 1 are added to achieve the content of 2.5 wt % said nanoparticles to polyethylene terephthalate, and melted at 270° C. and 80 rpm using a twin screw extruder to manufacture a polymer nanocomposite. A film is manufactured using the nanocomposite manufactured by the above-mentioned method.

Contrast Example 2

A sample is manufactured using the same method as the contrast example 1, except that the organic-modified smectite clay nanoparticles of the comparison example 1 are replaced by the nanocomposite manufactured in the comparison example 2, and the content of the clay nanoparticles is adjusted equally to that of polyethylene terephthalate by addition of polyethylene terephthalate.

Contrast Example 3

A sample is manufactured using the same method as the contrast example 1, except that the organic-modified smectite clay nanoparticles of the comparison example 1 are replaced by the nanocomposite manufactured in the comparison example 3, and the content of the clay nanoparticles is adjusted equally to that of polyethylene terephthalate by addition of polyethylene terephthalate.

Manufacture Example 1

A sample is manufactured using the same method as the contrast example 1, except that the organic-modified smectite clay nanoparticles of the comparison example 1 are replaced by the nanocomposite manufactured in the example 1, and the content of the clay nanoparticles is adjusted equally to that of polyethylene terephthalate by addition of polyethylene terephthalate.

Manufacturing Example 2

A sample is manufactured using the same method as the contrast example 1, except that the organic-modified smectite clay nanoparticles of the comparison example 1 are replaced by the nanocomposite manufactured in the example 2, and the content of the clay nanoparticles is adjusted equally to that of polyethylene terephthalate by addition of polyethylene terephthalate.

Figure 2:
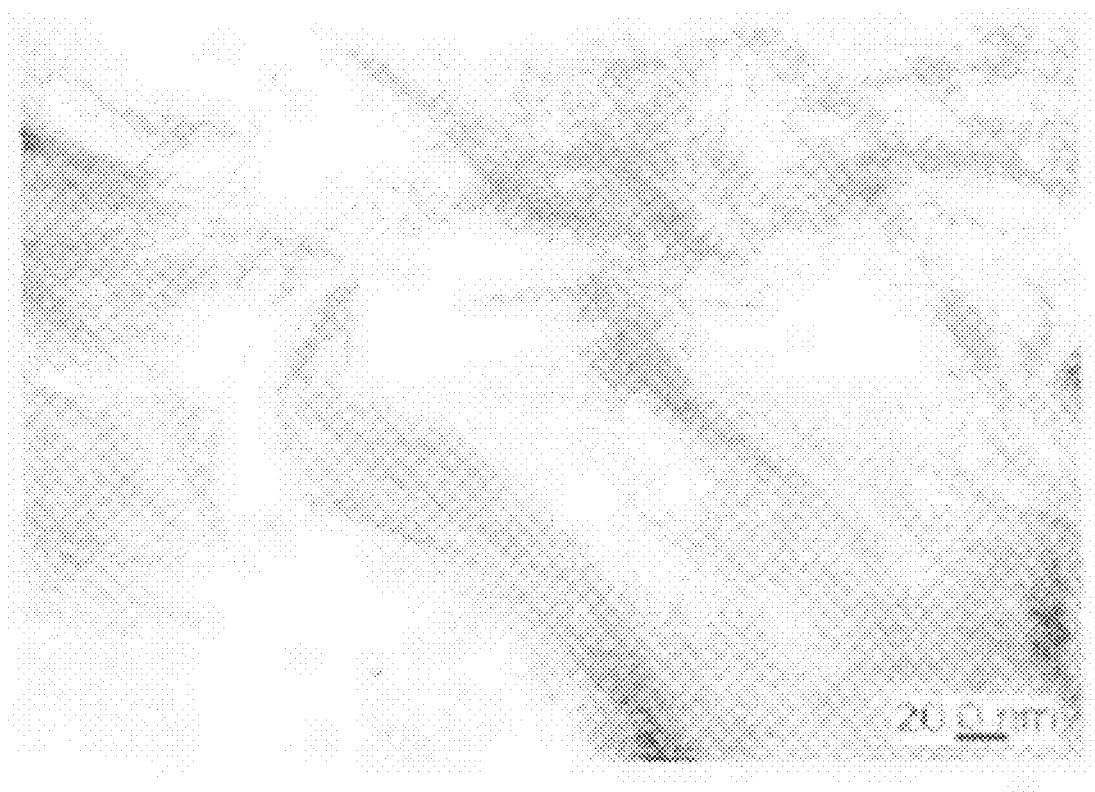
FIG. 2 is a transmission electron microscopy photograph of a composite obtained by the manufacturing method according to example 1 of the present invention.

In FIG. 1, (a) is an X-ray diffraction graph of the organic-modified smectite clay nanoparticles of the comparison example 1, (b) is an X-ray diffraction graph of the nanocomposite of the comparison example 2, (c) is an X-ray diffraction graph of the nanocomposite of the example 1, (d) is an X-ray diffraction graph of the nanocomposite of the contrast example 2, and (e) is an X-ray diffraction graph of the nanocomposite of the manufacture example 1. When a polymer chain is inserted between the clay layers to exfoliate the clay layers, the X-ray diffraction peak disappears. As shown in FIG. 1, diffraction peaks of (b) to (e) X-ray diffraction graphs disappear unlike the X-ray diffraction graph (a) of the organic-modified smectite clay nanoparticles. Therefore, it is found that the clay nanoparticles of the nanocomposites manufactured in the step (S1) are exfoliated. Meanwhile, FIG. 2 is a transmission electron microscope photograph of the nanocomposite of the example 1, where a white portion represents a polymer and a black portion represents exfoliated clay nanoparticles. FIG. 2 shows that the exfoliated clay nanoparticles are properly dispersed in the polyethylene terephthalate polymer matrix.

According to the American Society of Testing and Materials (ASTM) D638, the tensile strength of the polyethylene terephthalate nanocomposites manufactured in the above-mentioned manufacture example and contrast examples is measured at the speed of 20 mm/min, and the test result is shown in the following Table 1. The Table 1 shows that the sample of the manufacture example 1 using the nanocomposite obtained by the manufacturing method of the present invention has better mechanical property than the sample of the contrast example 1 using the nanocomposite obtained by the conventional method or the contrast example 2 manufactured without removal of the separated organic modifier.

TABLE 1

|  | Young's Modulus(MPa) | Breaking strain (%) | Yield stress (MPa) |
| --- | --- | --- | --- |
| Pure PET | 1020 | 280 | 34 |
| Comparison example 2 | 1227 | 40 | 38 |
| Manufacture example 1 | 1830 | 200 | 47 |
| Comparison example 1 | 1153 | 20 | 37 |

TABLE 2

|  | Temperature at weight loss of 10% (° C.) |
| --- | --- |
| Pure PET | 423.2 |
| Comparison example 2 | 429.3 |
| Manufacture example 1 | 431.5 |
| Comparison example 1 | 426.3 |

Meanwhile, referring to the Table 2, the weight reduction temperature at the weight loss of 10% is measured using a thermogravimetric analyzer. It is found that the sample of manufacture example 1 using the nanocomposite obtained by the manufacturing method of the present invention has better thermal stability than that of contrast example 1 obtained from a conventional manufacturing method or that of contrast example 2 manufactured without removal of the separated organic modifier.

And, referring to Table 3, to test discoloration of the polyethylene terephthalate nanocomposites manufactured through the above-mentioned examples, discoloration is measured based on the American Society of Testing and Materials (ASTM) D1925 and E313. It is found that the sample of the manufacture example 1 using the nanocomposite obtained by the manufacturing method of the present invention has better transparency than that of contrast example 1 obtained by a conventional manufacturing method or that of contrast example 2 manufactured without removal of the separated organic modifier.

TABLE 3

| American Society for Testing and Materials (ASTM) | Pure PET | Comparison example 1 | Manufacture example 1 |
| --- | --- | --- | --- |
| Discoloration measured using D1925 | 2.292 | 11.353 | 2.386 |
| Discoloration measured using E313 | 1.214 | 8.572 | 1.352 |

As described above, according to the manufacturing method of the present invention may remove the organic modifier that may deteriorate properties of the composite, from the exfoliated clay nanoparticles dispersed in the composite. Therefore, the present invention may improve the performance of a product using the nanocomposite, for example a mechanical property or a thermal stability, or reduce the likelihood of discoloration of the product.

The invention claimed is:

1. A manufacturing method of organic modifier-free exfoliated nano clay-polymer composite, comprising:
    (S1) dispersing layered clay nanoparticles modified by forming ionic bonds with an organic modifier in an acidic solvent and dissolving a thermoplastic polymer of polyethylene terephthalate in said acidic solvent to separate the organic modifier from the layered clay nanoparticles modified by forming ionic bonds with an organic modifier;
    (S2) adding the product of step (S1) to a non-solvent for the thermoplastic polymer of polyethylene terephthalate capable of dissolving the organic modifier separated from the layered clay nanoparticles modified by forming ionic bonds with an organic modifier, but incapable of dissolving said thermoplastic polymer of polyethylene terephthalate to precipitate a organic modifier-free exfoliated nano clay polymer composite; and
    (S3) separating the organic modifier-free exfoliated nano clay-polymer composite from all ingredients of step (S2).

2. The manufacturing method of organic modifier-free exfoliated nano clay-polymer composite according to claim 1,
    wherein, in step (S1), said layered clay nanoparticles modified by forming ionic bonds with the organic modifier are dispersed in at least one solvent selected from the group consisting of chloroform, ethyl ether, acetone, methyl isobutylketone, benzene, toluene, xylene, tetrahydrofuran, methylethylketone, normal hexane, normal pentane, normal octane and propanol to prepare a dispersion of organic-modified layered clay nanoparticles,
    followed by adding an acidic solvent and a thermoplastic polymer of polyethylene terephthalate to said dispersion and dissolving the thermoplastic polymer of polyethylene terephthalate.

3. The manufacturing method of organic modifier-free exfoliated nano clay-polymer composite according to claim 1,
    wherein the acidic solvent is at least one solvent selected from the group consisting of acetic acid, phosphoric acid, sulfuric acid and trifluoroacetic acid.

4. The manufacturing method of organic modifier-free exfoliated nano clay-polymer composite according to claim 2, wherein the acidic solvent is at least one solvent selected from the group consisting of acetic acid, phosphoric acid, sulfuric acid and trifluoroacetic acid.

5. The manufacturing method of organic modifier-free exfoliated nano clay-polymer composite according to claim 1,
wherein the non-solvent for the thermoplastic polymer of polyethylene terephthalate is at least one solvent selected from the group consisting of methanol, ethanol and water.

6. The manufacturing method of organic modifier-free exfoliated nano clay-polymer composite according to claim 1,
wherein the layered clay nanoparticles modified by forming ionic bonds with an organic modifier are at least one selected from the group consisting of organic-modified layered smectite clay nanoparticles, organic-modified layered mica clay nanoparticles, and mixtures thereof.

* * * * *